June 6, 1950 J. CLARK 2,510,073
PRESSURE ACTUATED PICKUP DEVICE
Filed May 19, 1947 3 Sheets-Sheet 1
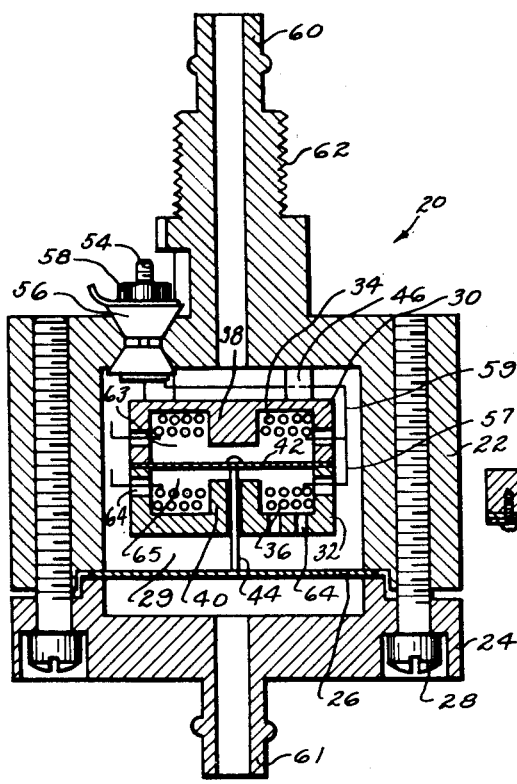
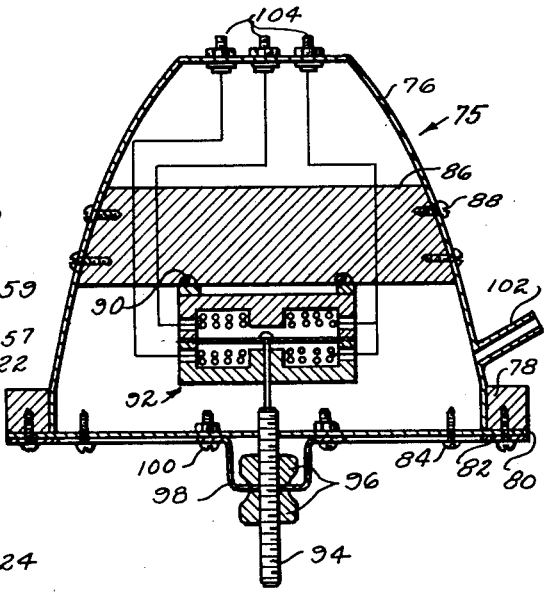
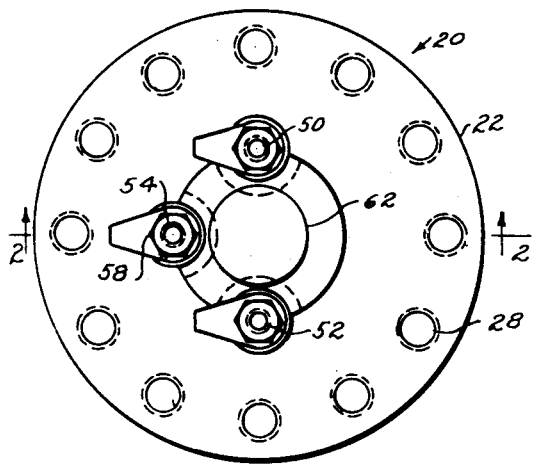
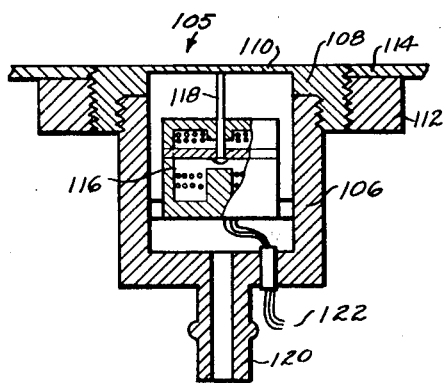
INVENTOR.
JAMES CLARK
BY Wade Koontz AND
Frederick W. Cotterman
ATTORNEYS June 6, 1950   J. CLARK   2,510,073
PRESSURE ACTUATED PICKUP DEVICE
Filed May 19, 1947   3 Sheets-Sheet 2
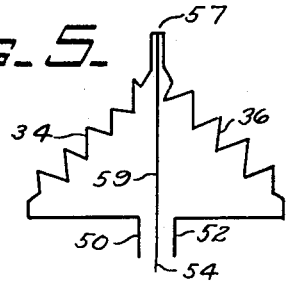
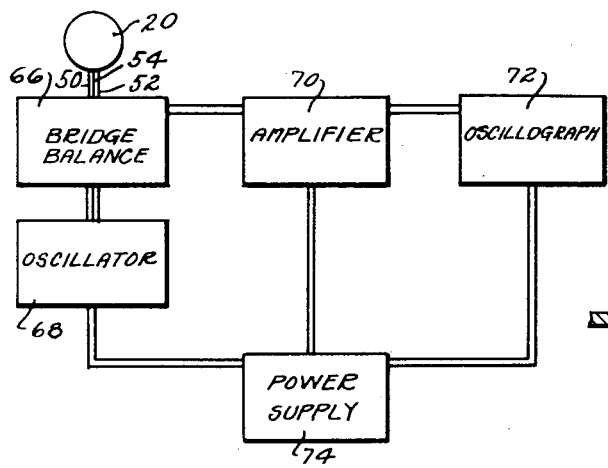
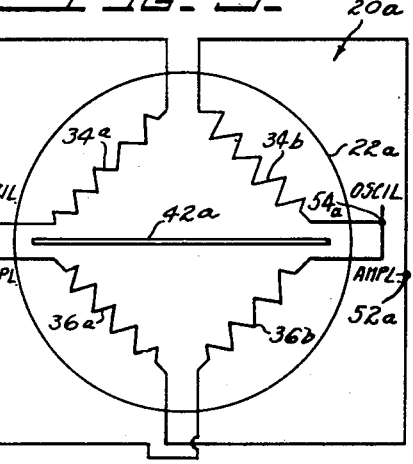
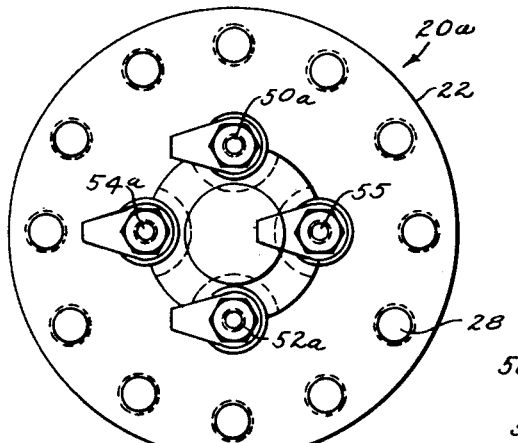
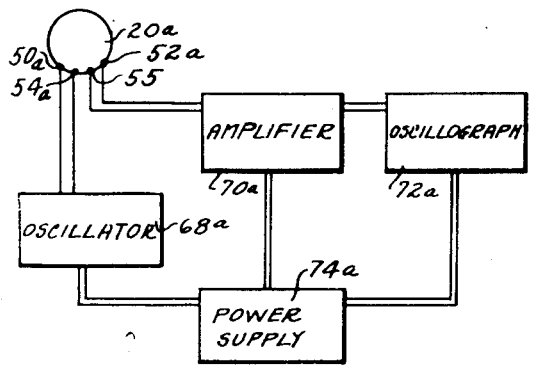
INVENTOR.
JAMES CLARK June 6, 1950    J. CLARK    2,510,073
PRESSURE ACTUATED PICKUP DEVICE
Filed May 19, 1947    3 Sheets-Sheet 3
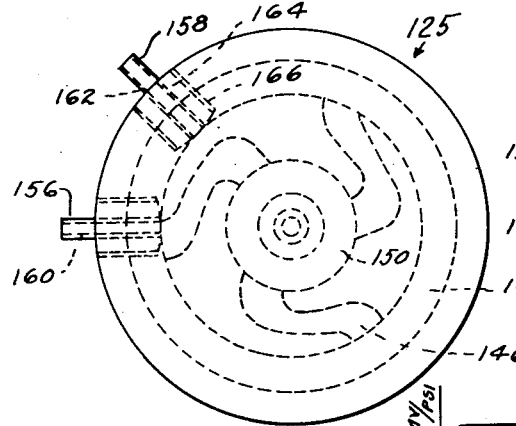
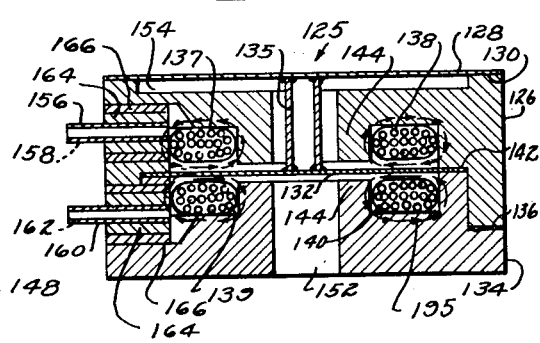
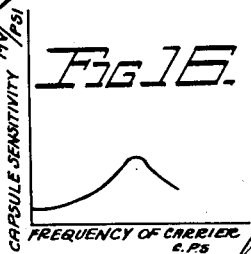
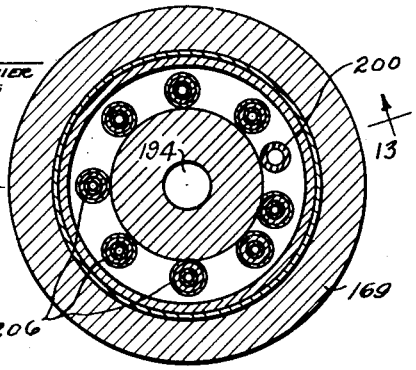
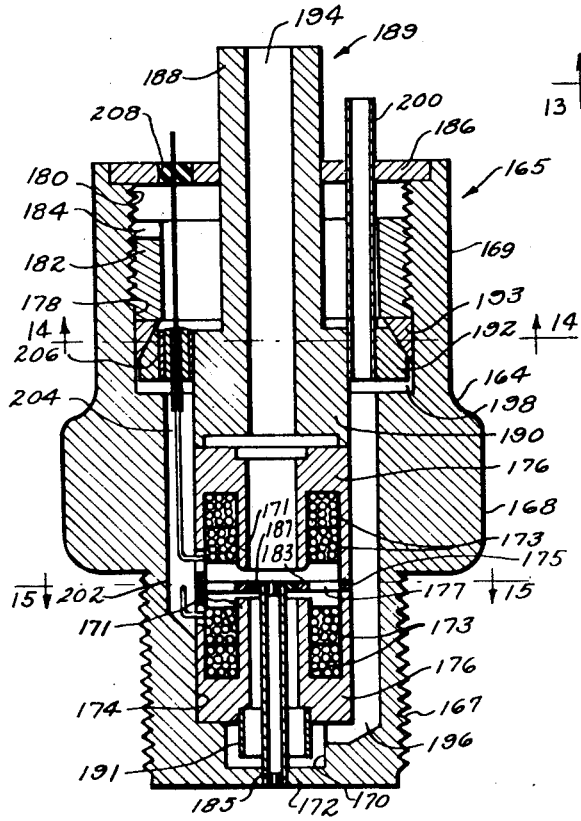
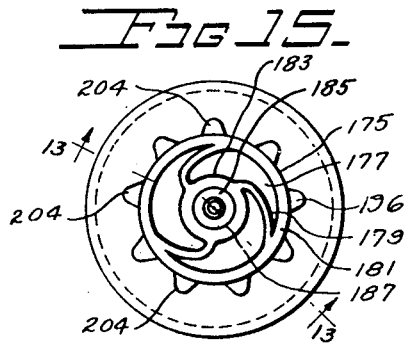
INVENTOR.
JAMES CLARK
BY Wade Kooity AND
Frederick W. Esterman
ATTORNEYS Patented June 6, 1950

2,510,073

UNITED STATES PATENT OFFICE 2,510,073

PRESSURE ACTUATED PICKUP DEVICE

James Clark, Dayton, Ohio

Application May 19, 1947, Serial No. 749,073

21 Claims. (Cl. 171—242)

(Granted under the act of March 3, 1883, as amended April 30, 1928; 370 O. G. 757)

The invention described herein may be manufactured and used by or for the Government for governmental purposes without payment to me of any royalty thereon.

This invention is a continuation in part of my copending application Serial No. 605,175, filed July 14, 1945, and relates to a pressure measuring system and more particularly to equipment for measuring pulsating and steady pressures by electronic means.

It has been proposed to measure pulsating pressure by using pressure responsive diaphragms connected to sensitive carbon pile resistances whose output was recorded by an oscillograph. It was found, however, that where there is any appreciable diaphragm movement the carbon granules tend to separate from each other, thus giving poor contact which has a nonlinear resistance characteristic, or they may pack together and refuse to follow the diaphragm pulsations. Moreover, upon repeated loading and unloading of the carbon granules which are in contact, the resulting abrasive action tends to pulverize them whereby the clearance between the granules or carbon pile is continually raised.

The carbon pile devices above described are substantially an adaptation of the carbon button microphone which is used mainly where accurate response may be sacrificed for high output, as in microphones presently used by aircraft pilots.

It is also a common practice in the art to connect pressure responsive diaphragms to velocity pickup units for picking up pulsating pressures. An example of this practice being the velocity microphone used in radio transmission, for which purpose the arrangement is highly desirable, since it operates upon a change in pressure. However, it will not operate on a constant pressure differential, and therefore can not be used to pick up pressure differentials such as are encountered in aerodynamic and hydraulic flow. These pressure differentials are the difference between an unknown pulsating pressure and a known constant pressure, consisting of a steady or static pressure with a pulsating or dynamic pressure superimposed upon it. In order therefore to pick up these pressure differentials it is necessary for the pressure sensitive device to respond to the static pressure as well as the dynamic pressure.

It has also been proposed to use pressure responsive diaphragms as part of a variable condenser to pick up pressure pulsations. Such a variable capacity pickup however has the disadvantage that if it is used in a D.-C. bridge it will only pick up the dynamic pressure, but will not pick up any static pressure differences since it responds only to a change in capacity. Moreover, if these capacity pickups are used in either a D.-C. bridge or an A.-C. bridge with an associate carrier system, it is necessary to have one stage of amplification adjacent to the pickup because of errors induced by the distributed capacitance of the leads to the condenser element, which results in a very large and bulky pickup which is impractical in aerodynamic and hydraulic applications.

Where optical systems with mirrors cemented to the pressure responsive diaphragms have been tried, the response to the device is so small for the pressure differentials being measured that an elaborate optical system is required. The result is that, in most applications, the vibration of the component parts in the optical system causes a greater error than the response of the optical system to the movement of the pressure responsive diaphragm.

A "sylphon" with mirrors attached has been substituted for the flat diaphragm, but while it provides a greater deflection, the spring rate is so low that the resonant frequency is only from 10 to 20 cycles per second which is entirely too low to measure the usual pulsating pressures encountered in aerodynamic and hydraulic flows. Moreover, the use of a "sylphon" in this situation is further limited because it expands and contracts with temperature changes which shifts the zero reference, whereby in wind tunnel and flight work the absolute value of the pressure differential is never certain since there is always a considerable temperature change with time in the wind tunnel and with altitude in flight work.

It is therefore an object of this invention to provide a device of the general character hereinbefore described but so constructed and arranged that it will accurately follow a pulsating pressure and will give a true value of the static and dynamic components of a pressure differential without shifting the zero reference in response to temperature changes.

Other objects and advantages will become evident as the invention is described in greater detail, reference being had to the drawings wherein:

Fig. 1 is a top plan view of a pressure sensitive capsule showing a form of my invention employing a reluctance, inductance, or other type of pickup unit in association with a diaphragm.

Fig. 2 is an axial section taken at 2—2 through Fig. 1, showing the interior construction.

Fig. 3 is an axial section through a modification of my device having a system wherein the zero of the reluctance unit is adjustable.

Fig. 4 is an axial section taken through a pressure sensitive capsule applicable for measuring pressures on an airfoil or hydrofoil where an opening in the skin is undesirable. It is particularly useful in analyzing supersonic flow on airfoils.

Fig. 5 is a diagram showing how the coils within the capsules shown in Figs. 1 through 4 may be connected so that the coils form two of the arms of a bridge, two of the leads being connected and a common lead being taken from the point of connection, leaving three leads to be brought out through the body for connection to associated equipment shown in Fig. 6.

Fig. 6 is a schematic view of one of the pressure sensitive devices and its associated equipment.

Fig. 7 is a top plan view of a capsule similar to that shown in Figs. 1 through 4 except that the coils within the capsule are so connected as to form all four of the arms of a bridge as shown in the diagram Fig. 9.

Fig. 8 is an axial section through a capsule similar to that shown in Fig. 4 except that the coils within the capsule are so connected as to form all four of the arms of a bridge, as shown in the diagram Fig. 9.

Fig. 9 is a diagram showing how the windings within the capsule may be connected to form all four of the arms of a bridge as indicated in Figs. 7 and 8.

Fig. 10 is a schematic view similar to Fig. 6 but modified for use with capsules shown in Figs. 7 through 9.

Figs. 11 and 12 show a plan and an axial section respectively of a modification of the device shown in Figs. 1 through 4 except that the flux path of the magnetic element passes through the housing itself instead of through a separate casing within the housing.

Figs. 13, 14 and 15 show an axial and two transverse sections respectively of a modification of the structure of the invention as shown in Figs. 1 through 4 and 6 whereby it is adapted for picking up high frequency pulsating and static pressures such as may occur in the combustion chamber of an internal combustion engine.

Fig. 16 is a response curve of the pressure capsules, shown in Figs. 2, 3, 4, 8, 12 and 13.

Like reference characters refer to like parts throughout the several views.

In Figs. 1 and 2 is shown a pressure sensitive capsule 20 which may employ a reluctance, inductance, or other type of pickup unit, a reluctance unit being shown by way of illustration. The unit consists of a chambered housing 22 having a diaphragm 26 closing an open side of the chamber, the diaphragm being clamped to the housing 22 by a clamping plate 24 held to the housing 22 by screws 28, to effect pressure tight joints between the several parts.

In the chamber 29 above the diaphragm is a reluctance unit which has a casing made in two parts 30 and 32 held together by means not shown. Coils 34 and 36 are carried on hubs 38 and 40 respectively which provide the magnetic poles. A small diaphragm 42 serves as an armature, being clamped at its outer edges between parts 30 and 32 of the casing and positioned midway of the ends of hubs 38 and 40 and connected to rod 44 which extends upward from the diaphragm 26. The casing 30—32 is secured to posts 46 which depend from the top of the housing 22. Terminal posts 50, 52, and 54, insulating bushing 56 and nuts 58, are provided for connection to the system Fig. 6. Two of the coil ends are connected by a common lead 59 to the post 54, the other coil ends being connected to the posts 50 and 52. A pressure tube connection 60 and a threaded mounting hub 62 extend upward from the housing 22, and a tube 61 extends downward from the clamping plate 24. Openings 64 connect the spaces 63—65 within the casing 30—32 to the space 29 within the housing 22. Where the space under the diaphragm 26 is to be subjected to the pressure of the ambient air, the tube 61 may be omitted and the opening through the plate 24 enlarged.

Fig. 5 shows how the one end of both coils 34 and 36 are joined at 57 within the chamber 29 and brought out by the lead 59 to the common terminal 54 while the other end of the coils are connected to the other terminals 50 and 52, this arrangement being used in connection with the associated equipment shown in Fig. 6, wherein two arms of an A.-C. bridge are in the capsule 20 as indicated in Figs. 1, 2 and 5 and the other two arms are adjustable and contained but not shown in the bridge balance unit 66 of Fig. 6. The bridge balance unit 66 is energized by an oscillator 68, the output of the bridge being fed into an amplifier 70, and the output of the amplifier being fed into an indicating meter or recording oscillograph. Power for these electronic circuits is furnished by a source of supply 74. The bridge 66, oscillator 68, amplifier 70, meter or recording oscillograph 72, and power supply 74 are commercially obtainable instruments or equipment well known in the art.

Instead of winding the capsule 20 as shown in Figs. 1 and 2, connecting its winding as shown in Fig. 5 and using it with associated equipment shown in Fig. 6, a like capsule (see Fig. 7) which may be designated 20a may be wound with four coils, 34a and 34b being on one side of the small diaphragm 42 and 36a and 36b on the other, (see diagrammatic representation Fig. 9). Such a winding provides eight coil ends which must be connected, there being four coil ends on one side of the small diaphragm 42a which are connected to four coil ends on the other side. The coil ends may therefore preferably be brought through openings in the casing 30—32 and connected, two ends to each terminal post 50a, 54a, 52a and 55 of Fig. 7. The remaining units, 68a, 70a, 72a and 74a of the associated equipment, Fig. 10, are like the corresponding units of Fig. 6. The bridge balance 66 of Fig. 6 is omitted since all four arms of the bridge are contained in the capsule 20a.

In order to design the most effective type of pickup unit for any purpose it is necessary to know the deflection at the center of the diaphragm for various loads. This may be expressed by the equation:

$$\delta = \frac{qr^4(1-\mu^2)}{5.33Eh^3}$$

wherein $\delta$ = deflection at center of diaphragm,
$q$ = pressure per unit area of diaphragm,
$r$ = radius of free diaphragm,
$\mu$ = Poisson's ratio,
$h$ = thickness of diaphragm,
$E$ = modulus of elasticity.

In order that the output of the pressure sensitive capsule shown in Figs. 1 and 2 may accurately portray any pulsating and static pressure which may be applied to it, it is necessary that the resonant frequency of its seismic system be higher than the frequency of any pulsating pressures which are to be measured.

The system of the pressure sensitive capsule shown in Figs. 1 and 2 consists of the diaphragm 26 with the armature or smaller diaphragm 42 connected to the diaphragm 26 by the rod 44. Where the spring rate of the rod 44 is very much higher than that of the diaphragm 26, which is usually the case, the resonant frequency of the system may be obtained from the following equation:

$$f_{D_2} = \frac{1}{2\pi} \frac{\sqrt{k_1 + k_2}}{m}$$

wherein $f_{D_2}$=resonant frequency of diaphragm connected to pickup unit, cycles per second, $k_1$=spring rate of diaphragm 26, pounds of distributed load per unit area of inch deflection of diaphragm center, $k_2$=spring rate of internal diaphragm 42 in pickup unit guiding its moving part, pounds applied load/inch deflection of tip of rod 44, $m$=mass of moving part of pickup.

By using the two preceding equations, the system of the pressure responsive capsule shown in Figs. 1 and 2 may be so designed as to accurately portray the pulsating or steady pressure applied to it.

Fig. 3 shows a pressure sensitive device 75 in which a housing 76 has one open side with a flange 78 around the edge of the opening. A diaphragm 80 is clamped between the flange 78 and a clamping ring 82, pressure tight, by screws 84. A support 86 extends across the space within the housing 76, being fastened in the housing by screws 88.

Secured to the support 86 by screws 90 is a reluctance unit 92 which is similar to that shown in Fig. 2 except that the rod 94 is threaded at the outer end and provided with adjusting nuts 96, one on each side of the yoke 98. The yoke 98 is secured to the diaphragm 80 by screws and nut stenings 100, whereby the zero position of the iphragm 80 and that of the reluctance unit 92 may be coordinated.

A pressure tube connection 102 communicates with the inside of the housing 76, whereby a reference pressure may be employed within the housing and pressure impulses measured on the diaphragm 80, or, the atmosphere may serve as a reference pressure on the outside of the diaphragm 80, and the pressure impulses which are to be measured admitted through the connection 102. The leads from the reluctance unit may be connected to insulated terminal posts 104 in the end of the housing 76.

Fig. 4 shows a pressure capsule 105 applicable in measuring pressure distribution on a surface in any situation where an opening in the surface is undesirable, one such instance being the measuring of pressures due to supersonic flow over an airfoil. This capsule comprises a cup-shaped body 106 externally threaded at the upper open end to receive the cap 108. Cap 108 has a diaphragm 110 formed integral therewith and is externally threaded to fit a nut 112 which is welded or similarly secured to the under side of the skin 114 of an airfoil, the capsule being screwed into the nut 112 to such an extent that the diaphragm 110 is flush with, and forms a part of, the skin of the airfoil. This is an important feature of this design since it gives a smooth surface either for hydraulic flow or for air flow. It is especially important in determining pressures due to supersonic flows since an orifice in the skin would tend to form local disturbances or shock waves, thereby causing an error in the pressure reading. The cap 108 and mounting nut 112 are purposely designed with sufficient stiffness to prevent any skin stresses from reaching the diaphragm 110. With this construction, absolute instantaneous response is assured and all chance of disturbances in the flow eliminated. A reluctance, inductance or other type of pickup unit 116 including upper and lower casing parts similar to the casing parts 30 and 32 of Fig. 2 is supported in the body 106, the vibratory element of the pickup being connected by a rod or link 118 to the diaphragm 110. A tube connection 120 admits the reference pressure.

The three leads 122 from the pickup unit 116 of the capsule 105 may be connected as shown in Fig. 5, the three leads being brought out of the body for connection to the bridge balance unit 66 of Fig. 6, in which case two arms only of the bridge are contained in the pickup 116, or, the device may be provided with four leads 122a, the four leads 122a being provided by connecting the eight coil ends as shown in Fig. 9 then bringing out the leads as shown in Fig. 8 for connection to the associated equipment shown in Fig. 10 in which all four arms of the bridge are contained within the pickup 116a.

Although the unit 75 shown in Fig. 3 has its leads connected as diagrammatically shown in Fig. 5 for connection to the associated equipment shown in Fig. 6, obviously it may contain four arms of the bridge, the coil ends being connected as in Fig. 9 so as to provide four leads for connection to the associated equipment of Fig. 10.

Figs. 11 and 12 show a capsule 125 which is like Fig. 4 or 8 in that it is particularly adapted for measuring pressures due to supersonic flow over an airfoil. It differs from the other exemplifications herein shown in that in Fig. 11 the housing of the capsule provides the magnetic circuit while in previously described modifications a separately made pickup furnished the magnetic circuit, whereby the housing could, if desired, be made of nonmagnetic material.

Capsule 125, iFgs. 11 and 12, comprises a housing 126 having a pressure responsive diaphragm 128 soldered or similarly secured at 130 to the housing. A magnetic diaphragm 132 is held in a recess in the underside of the housing by a clamping plate 134 which is soldered or similarly secured at 136. Diaphragms 128 and 132 are secured at their centers by soldering or equivalent means to the ends of a tubular member 135 which links them together for synchronous vibration.

The underside of the housing 126 and the upper side of the clamping plate 134 are recessed at 137 and 139 for the coils 138 and 140 respectively, the coil recesses 137 and 139 being so located and proportioned as to leave a margin 142 by which the magnetic diaphragm 132 is clamped, and magnetic pole pieces 144 which extend close up to but not against the magnetic diaphragm 132.

The annular space in the diaphragm 132 which lies between the coil recesses is cut away so as to provide spokes 146 thereby leaving a rim 148, which is held clamped at 142, and a hub portion 150 which is of the same diameter as the poles 144. By this means minimum resistance to flexure of the magnetic diaphragm by the pressure responsive diaphragm is attained. The openings between the spokes 146 of the magnetic diaphragm permit movement of a fluid through a fluid connection opening 152 through the space between the coils 138 and 140 to the space 154 on the underside of the pressure responsive diaphragm 128.

Where only one pressure connection 152 is provided as shown, the pressure responsive diaphragm 128 may have the upper side exposed to ambient air which may be the pressure which is to be measured or the reference pressure as desired.

Four winding terminals are provided, two circumferentially spaced terminals 156 and 158 communicating with the annular recess 137, and two more, 160 and 162, communicating with the annular recess 139. The terminals 156, 158, 160 and 162 are preferably made of "Kovar" alloy tubing fitted into glass sleeves 164. The glass sleeves 164 are fitted into "Kovar" alloy bushings 166, the tubular terminals, the glass sleeves, and the bushings all being fused together. Inasmuch as the "Kovar" alloy tubular terminals and bushings, and the glass sleeves have the same coefficient of expansion, they are readily adaptable to the above procedure.

The terminals 156, 158, 160 and 162 are copper plated and tinned, bushings 166 being soldered in the housing parts thus providing a pressure seal for the terminals. Opposite ends of the coil 138 are threaded from the inside through the terminals 156 and 158, and opposite ends of the coil 140 are threaded from the inside through the terminals 160 and 162.

Since there are only two coils and four coil ends brought out through four terminals, the capsule 125, Fig. 12, had preferably be connected as shown in Fig. 5 and used in a system of associated equipment as shown in Fig. 6. Obviously, however, this device may be wound with four coils, two in each recess 137, 139, and eight coil ends then connected as in Fig. 9 for use with associated equipment shown in Fig. 10.

Figs. 13, 14 and 15 show a pressure sensitive plug 165 adapted for picking up high frequency pulsating and steady pressures, such, for instance, as may occur in the combustion chambers of internal combustion engines. The body 169 of the plug is externally threaded at 167 for screwing into corresponding threads in an engine cylinder, a portion 168 of the body being polygonal for engagement by a wrench and the remaining portion being round.

The extreme lower end of the body 169 is bored blind as at 170 leaving a relatively thick pressure sensitive diaphragm 172 integral although it may be bored through and a similar diaphragm suitably attached. The mid-portion of the body is bored somewhat larger as at 174 for receiving the coil casings 176 which contain pole pieces 171, the casings being provided with annular recesses to receive the four coils 173. A magnetic diaphragm 175 is held between the interfacing ends of the parts 176 of the coil casings. Diaphragm 175 is cut away at 177 leaving a series of spokes 179 (see Fig. 15) which join a rim 181 to a center portion 183, whereby the magnetic diaphragm 175 offers minimum resistance to being vibrated by the pressure sensitive diaphram 172. The cutaway portion 177 is adjacent and in alignment with the recesses which contain the coils 173. A metal tube 185 joins the magnetic diaphragm 175 to the pressure responsive diaphragm 172 for synchronous vibration. A nonmagnetic washer 187 is interposed in the connection between the diaphragm 175 and the tube 185 to prevent magnetic leakage through the tube back to the coil casing 176. Part of the body is counterbored at 178 and internally threaded at 180 for the clamping nut 182 which has spanner slots 184 for engagement with a spanner wrench. A cover plate 186 is fitted with a recess in the top of the plug body 169.

A clamping sleeve 189 has the upper portion 188 extending through the cover plate 186, the lower end 190 fitted to the bore 174, and a flange 192 intermediate the ends. A soft copper seal ring 193 of V-shaped cross section is interposed between the flange 192 and the lower end of the clamping nut 182 to provide a pressure tight seal for the space below the flange. Tightening the nut 182 presses the seal ring 193 against the flange 192 which presses the end 190 of the clamping sleeve against the coil casings 176, thereby clamping the several parts together and effecting a seal at the same time.

A passageway 194 for the flow of a fluid under pressure extends centrally through the clamping sleeve 189 and the coil casing 176 to the pressure responsive diaphragm 172. A tubular baffle 191 compels the moving pressure fluid to come in close contact with the diaphragm. From the diaphragm the flow is radially outward and upward through a passageway 196 to the space 198 under the flange 192. A tube 200 passes through the cover 186 for connecting the space 198 to the atmosphere, or where other refrigerating fluids are used, for returning it to the source of supply.

The eight ends of the four coils 173 are brought out through holes 202 in the walls of the coil casings 176 into a series of circumferentially spaced grooves 204, then up and through a series of pressure sealed insulators 206 which are constructed in the same manner and of the same material as described relative to the insulators shown and described with reference to Figs. 11 and 12. The wires are soldered to the bushings where they pass therethrough then taken up through insulating collars 208 to the outside where they may be connected as in Fig. 9 for use with associated equipment Fig. 10. If desired, two instead of four coils 173 may be contained in the coil casings in which case they should be connected as shown in Fig. 5 for use with associated equipment Fig. 6.

One of the serious difficulties encountered in the design of pressure sensitive devices of the character herein shown is that the zero reference changes with changes in the temperature of the device. By using "Invar" steel or other alloys having a very low thermal coefficient of expansion for the housing parts and the diaphragm, substantially all errors due to temperature variation are eliminated. Similarly by winding the coil with "Copel" wire which has a very low temperature coefficient of resistivity, the change in resistance with temperature change in the coils of a unit is practically eliminated.

The magnetic circuits may be made identical electrically by carefully annealing the housing parts after machining and then selecting matched sets. Where the electric and magnetic structure on one side of the diaphragm is exactly like that on the other side of the diaphragm, and a minute structural change of the parts due to a slight temperature rise occurs, one side will cancel out the other, and the zero reference will remain constant.

The operation of the devices herein shown to illustrate the invention is substantially the same in the several exemplifications. The bridge which comprises the pickup coils, or of which the pickup coils form a part, is energized by the power supply unit 74 of Fig. 6, or 74a of Fig. 10, through the oscillator 68 or 68a. The pickup coils are so wound that the flux flows in the direction of the arrows 195 (see Fig. 12) and so proportioned that as long as the magnetic diaphragm remains positioned midway of the pickup poles the flux on both sides of the diaphragm and consequently the voltage in the coils on both sides of the diaphragm will remain substantially equal.

When air or any other fluid under a steady or a pulsating pressure is caused to impinge on one side of the diaphragm with a greater or less force than the pressure against the other side of the diaphragm the pressure responsive diaphragm will be displaced, which in turn correspondingly displaces the magnetic diaphragm. This increases the flux in one magnetic circuit and decreases the flux in the other, thereby changing the inductive reactance of the coils which are arms of the A.-C. bridge. This change in reactance is reflected in the electric circuit of the bridge as a change in A.-C. resistance of the bridge arms contained in the capsule. This change in resistance of the bridge arms causes an unbalance of the bridge, thereby causing a change in amplitude of the carrier which is furnished by the oscillator. This modulated carrier is amplified and demodulated by amplifier 70 or 70a and recorded by recording oscillograph 72 or 72a as shown in Figs. 6 and 10 respectively.

The maximum sensitivity of the capsule and the frequency of the carrier at which it occurs may be determined by controlling the eddy current losses in the magnetic circuit comprised of pole pieces 171 and coil casings 176 and the magnetic diaphragm 175, and by the proper selection of material and dimensions of the various component parts, and by the size of wire, number of turns in each coil, and the current through the four coils 173.

The change in sensitivity with change in frequency of the carrier furnished by oscillator 70 or 70a is shown in Fig. 16 where the capsule sensitivity is plotted against frequency of the carrier. This diagram shows the carrier frequency at which maximum sensitivity is attained. This frequency may be varied by the changes hereinbefore enumerated.

In using the pressure sensitive plug 165, Figs. 13, 14 and 15 the plug is screwed into the cylinder of an internal combustion engine thus exposing the underside of the diaphragm 172 to the high temperature and high pressure, high frequency pulsations and steady pressure within the cylinder. A predetermined reference pressure is then made to flow in at 194 and out through the tube 200, means, not shown, being provided to control both inflow and outflow whereby the reference pressure may be maintained constant and at the desired value. Since the reference pressure medium may preferably be refrigerated air or other fluid, it acts as a coolant to maintain a sufficiently low temperature in and around the coils and diaphragm. Otherwise than the substitution of a moving, rather than a static, reference pressure, the plug 165 is electrically connected and otherwise like the other exemplifications herein disclosed.

By following the rules of design herein disclosed, the resonant frequency of the seismic system of the pressure sensitive capsule may be made sufficiently high to be well above the frequency of any pulsating pressures encountered in flight or in wind tunnel or hydraulic work.

The equipment herein disclosed is applicable to many other situations not hereinbefore mentioned. By appropriate design and application, the instantaneous pressures in the combustion chambers of rockets may be evaluated. It may be used in hydraulic work to obtain steady static, pulsating and transient pressures in fans, blowers, compressors, etc. It has proven useful in determining the flow characteristics about and adjacent to aerodynamic bodies. It is valuable as an aid in studying turbulence in air and other fluid flows. It has been used to advantage in physiology studies to record instantaneous pressures in oxygen masks and associate equipment in order to appraise their characteristics for high altitude flight. It has been employed in physiology studies for accurately recording the instantaneous blood pressure as an aid in studying heart action under various conditions.

Having described my invention, I claim:

1. In a device of the character described, a chambered housing, a pressure actuated diaphragm forming an outer wall of the chamber in said housing, electric coils within said chamber coaxial with said diaphragm, a magnetic diaphragm coaxial with and adjacent to said coils, linkage positively connecting the two said diaphragms for synchronous movement, means in said housing cooperating with said diaphragm to provide a flux path independent of said pressure actuated diaphragm for said coils, a connection for introducing a pressure into said chamber and around both sides of said magnetic diaphragm, and pressure sealed electrical terminal means for insulatedly bringing the ends of said coils out through the wall of said chamber.

2. In a device of the character described, a chambered housing, a pressure actuated diaphragm forming an outside wall of the chamber in said housing, axially spaced electric coils within said chamber coaxial with said diaphragm, a magnetic diaphragm coaxial with and between said coils, a link positively connecting the two said diaphragms for synchronous movement, a connection for introducing a pressure into said chamber and around both sides of said magnetic diaphragm, and pressure sealed electrical terminal means for insulatedly bringing the ends of said coils out through the wall of said chamber.

3. A device for electrically indicating variations in a fluid pressure, which consists of a housing open at one side, a smooth diaphragm fixed pressure tight over said open side and forming a pressure chamber, an electromagnetic unit supported in the pressure chamber, said electromagnetic unit including coils and a magnetic diaphragm member adapted upon movement from a neutral position to change the inductive reactance and Q in said coils, a link connecting said smooth diaphragm to said magnetic diaphragm member to actuate said magnetic diaphragm member, a passageway for conducting a reference pressure into said pressure chamber and around both sides of said magnetic diaphragm member, the outer surface of said smooth diaphragm being subjected to the pressure to be measured.

4. A device for electrically indicating variations in a fluid pressure, which consists of a housing in two parts, a diaphragm clamped pressure tight at its outer edge between said parts, thereby dividing the interior of said housing into two chambers, an electromagnetic unit supported in one of said chambers, said electromagnetic unit including coils and a magnetic plate member adapted upon movement from a neutral position to change the inductive reactance and Q in said coils, a link connecting said diaphragm to said plate member to actuate said plate member, a passageway for conducting the pressure to be measured into one of said chambers and a passageway conducting the reference pressure into the other of said chambers and around both sides of said plate member.

5. A device for electrically indicating variations in a fluid pressure which consists of a housing in two parts, a diaphragm clamped pressure tight at its outer edge between said parts thereby dividing the interior of said housing into two chambers, a reluctance unit supported in one of said chambers, said reluctance unit including a casing having two pole pieces, coils on said pole pieces, and an armature between the pole pieces having one side adjacent each pole piece and adapted upon movement from a neutral position to change the inductive reactance and Q in said coils, a link fixedly connecting said diaphragm to said armature to actuate said armature, a passageway for conducting the pressure to be measured into one of said chambers and a passageway for conducting the reference pressure into the other of said chambers and around both sides of said armature.

6. A device for electrically indicating variations in a fluid pressure which consists of a housing, a diaphragm held at its outer edge dividing the interior of said housing into two chambers, a reluctance unit supported in one of said chambers, said reluctance unit including a cylindrical casing in two parts, each having a concentric pole piece, coils on said pole pieces and an armature in the form of a second diaphragm between the pole pieces, said second diaphragm being held at its outer edge between the two parts of said casing, said second diaphragm being adapted upon movement from a neutral position to change the inductive reactance and Q in said coils, a link rigidly connecting the first said diaphragm to said second diaphragm to actuate said second diaphragm, a passageway for conducting the pressure to be measured into one of said chambers and a passageway for connecting the reference pressure into the other of said chambers, said casing having openings to permit said reference pressure to extend around both sides of said armature.

7. A device for measuring the instantaneous pressure normal to the surface of a body due to movement of a fluid stream relative thereto at a selected point on said surface, said device comprising a hollow member closed at one end by a diaphragm thereby forming a pressure tight housing, means on said housing for supporting it in said body with the outer surface of the diaphragm flush with and forming a part of the outer surface of said body, a pressure responsive electrical pickup supported within said housing, including an electrical circuit element and a flexible flat disk of magnetic material, the movement of said flexible flat disk of magnetic material controlling the characteristics of the electrical circuits, and a link connecting said diaphragm to said flexible flat disk of magnetic material.

8. A device for measuring the instantaneous pressure normal to the surface of a body due to movement of a fluid stream relative thereto, at a selected point on said surface, said device comprising a hollow member open at one end, a cap adapted to be secured to said open end for closing said open end pressure tight, thereby forming a housing, the mid-portion of said cap being reduced in thickness to form a diaphragm, means at the periphery of said cap for supporting it in said body with the outer surface of the diaphragm flush with and forming a part of the outer surface of said body, an electrical pickup supported within said housing including an electrical circuit element and a second diaphragm, the movement of said second diaphragm controlling the characteristics of the electrical circuits, and a link fixed to and connecting the first and second diaphragms for coincident movement.

9. The device defined in claim 8 with the addition of a passageway for conducting a reference pressure into said housing.

10. The device defined in claim 8 wherein the interior of the housing is evacuated and sealed.

11. A device for electrically indicating variation in fluid pressure impulses which consists of a housing, a diaphragm extending across said housing, its inner side forming one wall of a pressure measuring chamber, an electromagnetic unit supported in the pressure measuring chamber, said electromagnetic unit including coils and a magnetic plate member adapted, upon movement from the neutral position, to change the inductive reactance and Q in said coils, a link connecting said diaphragm to said magnetic plate member to actuate said magnetic plate member, a passageway for conducting the pressure to be measured into the pressure measuring chamber, the other side of said diaphragm being adapted to be exposed to the atmosphere.

12. The device of claim 11 with means to adjust the length of said link.

13. The device of claim 1 wherein there are three terminal means and two coils, two of the coil ends, one on each coil, being connected together to one of the terminal means, and the other two coil ends being each connected to a separate terminal means, the two coils being thus adapted to form the two arms of an A.-C. bridge.

14. The device of claim 4 wherein there are four terminal means and four coils, the eight coil ends being brought to the outside of said housing through said pressure sealed electrical terminal means and connected, coil ends on one side of the diaphragm to coil ends on the other side of the diaphragm, thereby forming the four arms of an A.-C. bridge within the housing.

15. A device for electrically indicating variations in a fluid pressure which consists of a first and a second housing part of magnetic material, a diaphragm of magnetic material clamped pressure tight at its outer edges between the two housing parts, the interfacing sides of said housing parts being recessed to permit vibration of the unclamped portion of said magnetic diaphragm, a pressure responsive diaphragm secured pressure tight at its outer edge to the outer face of the first housing part, said first housing part being recessed underneath said pressure responsive diaphragm to permit vibration of said pressure responsive diaphragm, there being a fluid opening connecting the recesses between the two diaphragms and another fluid opening extending through the second housing part from the outside to the recess of the second housing part, linkage connecting the two diaphragms for unitary vibration, coils lying on opposite sides of the magnetic diaphragm, and pressure sealed electrical terminal means for insulatedly bringing the ends of said coils out through the wall of said chamber.

16. The device of claim 15 wherein the magnetic diaphragm has fluid openings therethrough for connecting the two recesses in the interfacing sides of the housing parts.

17. The device of claim 1 wherein the said connection for introducing pressure into said chamber is prolonged so as to provide a fluid inlet from the outside of the housing through the wall thereof into said chamber and a fluid outlet from the inside of said chamber through the wall thereof to the outside of the housing at a point spaced apart from the inlet.

18. The device of claim 17 wherein the said connection is so constructed and arranged that pressure fluid passing therethrough passes through the coils and over the inner surface of the pressure actuated diaphragm.

19. Claim 1 wherein the said chamber is evacuated and sealed.

20. Claim 5 wherein one of said chambers is evacuated and sealed to provide a reference pressure.

21. In a device of the character described, a chambered housing, a pressure-actuated diaphragm forming an outer wall of the chamber in said housing, electric coils within said chamber coaxial with said diaphragm, a connection for bringing a reference pressure into said chamber and against the inner side of said diaphragm, a magnetic diaphragm supported within said chamber and between said coils, both sides of said magnetic diaphragm being exposed to said reference pressure, a post having one end fast on the pressure-actuated diaphragm and the other end fast on the magnetic diaphragm, and pressure sealed electrical terminal means for insulatedly bringing the ends of the coils out through the wall of said chamber.

JAMES CLARK.

REFERENCES CITED

The following references are of record in the file of this patent:

UNITED STATES PATENTS

| Number | Name | Date |
| --- | --- | --- |
| 1,718,494 | Schurig | June 25, 1929 |
| 1,891,156 | Harrison | Dec. 13, 1932 |
| 2,240,184 | Hathaway | Apr. 29, 1941 |
| 2,260,837 | Kuehni | Oct. 28, 1941 |
| 2,376,156 | Kuehni | May 15, 1945 |
| 2,414,756 | May | Jan. 21, 1947 |
| 2,430,757 | Conrad et al. | Nov. 11, 1947 |
| 2,460,076 | Emerson | Jan. 25, 1949 |